United States Patent [19]

Musschoot

[11] 3,770,097

[45] Nov. 6, 1973

[54] VIBRATORY CONVEYOR WITH SOUND DEADENING MEANS

[75] Inventor: Albert Musschoot, Barrington, Ill.

[73] Assignee: General Kinematics Corporation, Barrington, Ill.

[22] Filed: Feb. 29, 1972

[21] Appl. No.: 230,312

[52] U.S. Cl. .......................................... 198/220 BA
[51] Int. Cl. .............................................. B65g 27/00
[58] Field of Search ................ 198/220 BA, DIG. 7; 209/365 B; 181/33 M, 33 J; 248/20, 358 R

[56] References Cited
UNITED STATES PATENTS

| | | | |
|---|---|---|---|
| 3,295,667 | 1/1967 | Kittle | 198/220 BA |
| 1,748,039 | 2/1930 | Kennedy | 181/33 M |
| 1,622,469 | 3/1927 | Scott | 181/33 A |
| 2,208,596 | 7/1940 | Parks | 209/365 B |
| 3,117,054 | 1/1964 | Antorucci | 181/33 A |

Primary Examiner—Evon C. Blunk
Assistant Examiner—Douglas D. Watts
Attorney—Hofgren et al.

[57] ABSTRACT

A vibratory conveyor for conveying castings from one point to another while shaking loose adhered sand therefrom. The conveyor includes a grate-like conveying surface formed of metal to support heavy castings of the like as well as to be resistant to the heat of still hot castings. A vibratory mechanism is associated with the metal grate for vibrating the same in such a way as to convey the castings. In order to preclude the steel grate from "ringing" as it repetitively contacts the castings during operation, an elongated tube is secured to the underside of the grate. The tube is filled with lead shot and serves to dampen the vibration of the grate in the audible range.

4 Claims, 3 Drawing Figures

PATENTED NOV 6 1973  3,770,097

VIBRATION IMPARTING MEANS

VIBRATORY CONVEYOR WITH SOUND DEADENING MEANS

BACKGROUND OF THE INVENTION

This invention relates to vibratory conveyors, and more particularly, to vibratory conveyors having grate-like metal conveying surfaces for conveying heavy metallic objects or the like.

Vibratory conveyors of large size are finding increasing use in foundry operations or the like by reason of the fact that the same can advantageously be employed to convey hot castings from one point to another while shaking loose therefrom, the sand remaining adhered to the castings from the casting process. Typically, such conveyors have a metal conveying surface in the form of a grate which supports the castings while permitting the sand shaken loose therefrom to pass therethrough.

Because of the very nature of such vibratory conveyors, repetitive metal-to-metal contact occurs during the conveying and shake-out process between the grate-like conveying surface and the castings received thereon. As a result, extremely high noise levels result. All too frequently, the noise levels are sufficiently high so that after prolonged exposure thereto, the hearing of persons in the general vicinity may become impaired.

One principal source of the high noise level during such operations is "ringing" of the grate defining the conveying surface. Initial metal-to-metal contact causes the grate-like conveying surface to begin to vibrate and the same will continue producing sounds of high intensity and in the audible range, until dampened, as by subsequent metal-to-metal contact with the castings. Such dampening, however, is inconsequential since the very event causing he dampening also results in recurrent initiation of the vibration.

Nor does the particulate sand shaken loose from the castings provide a substantial dampening action while on the conveying surface itself. Firstly, the mass of the conveying surface is so large compared to that of an individual particle of sand that the presence of the latter on the conveying surface is incapable of absorbing any significant amount of energy. Moreover, the residence time of particulate sand on the surface is extremely short inasmuch as it quickly passes through the openings in the grate-like surface as part of the shake-out operation.

Thus, there is a real need for means for dampening vibrations in vibratory conveyors and shake-out devices employed in foundry operations.

SUMMARY OF THE INVENTION

It is the principal object of the invention to provide a new and improved vibratory device of a type having a metal, grate-like surface adapted to receive castings or the like to impart vibration thereto. More specifically, it is the object of the invention to provide means for damping vibrations of such surfaces caused by metal-to-metal contact of the same with castings received thereon so as to preclude the surface from "ringing" within the audible range.

The exemplary embodiment of the invention achieves the foregoing objects in a vibratory conveying structure including an elongated, metal grate defining a conveying surface, and vibrating means for vibrating the surface so that castings received on the surface will be vibrated to be conveyed and have sand particles adhered thereto shaken loose therefrom by the provision of a body of relatively soft material secured to the underside of the grate. The soft material is chosen to be of the type that will not support vibration in the audible range.

The exemplary embodiment employs a tube, preferably formed of metal, filled with lead shot for this purpose. The filled tube is secured to the underside of the grate in abutment therewith. According to one form, the aforementioned tube may be sandwiched between two grate structures and is elongated in the direction of elongation of the grate defining a conveying surface. Moreover, the tube is chosen to be sufficiently small so that its width constitutes but a minor fraction of the width of the grate-like conveying surface so as not to interfere with the passage of sand shaken loose from castings through the apertures in the grate-like conveying surface.

The formation of the tube of metal plus the use of a soft metal shot provides temperature resistance in that frequently, such conveyors are subject to relatively high heat conducted thereto from hot, but solidified castings.

Other objects and advantages of the invention will become apparent from the following specification taken in conjunction with the accompanying drawings.

DESCRIPTION OF THE PREFERRED EMBODIMENT

Figure 1:
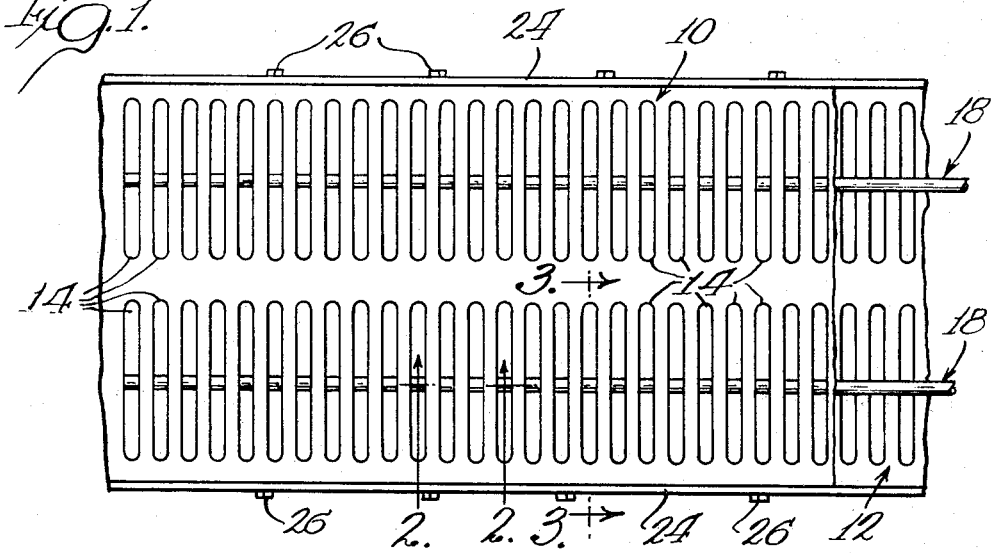
FIG. 1 is a fragmentary, plan view of a vibratory conveyor made according to the invention.
Figure 2:
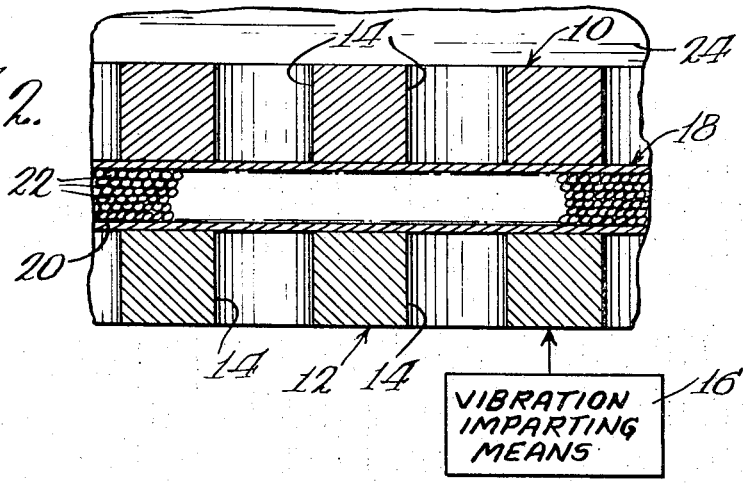
FIG. 2 is a vertical section taken approximately along the line 2—2 of FIG. 1 and further illustrating schematically, a vibration imparting means for the conveying surface.
Figure 3:
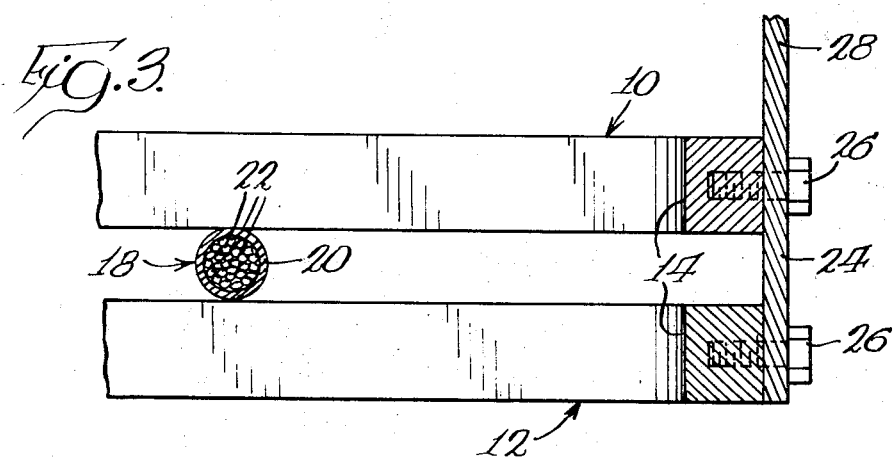
FIG. 3 is a fragmentaty vertical section taken approximately along the line 3—3 of FIG. 1.

An exemplary embodiment of the vibratory conveyor and shake-out apparatus is illustrated in FIGS. 1–3 and is seen to include an upper grate, generally designated 10, and a lower grate, generally designated 12. Both of the grates 10 and 12 include a series of closely spaced, elongated openings 14 and, as illustrated, the openings 14 in the upper grate 10 are aligned with the openings 14 in the lower grate 12, although this need not be the case.

As generally alluded to previously, the conveyor and shake-out device of the invention is intended to be used in foundry operations for conveying castings from one point to another while simultaneously breaking loose the adhesion of sand employed in a casting process to the castings being conveyed. Since frequently, the castings conveyed by the device will be relatively fresh from the casting process, i.e., substantially above ambient temperature, the component parts of the device are preferably formed of a material that can withstand such temperatures without failing. Moreover, since the device may be used to convey rather heavy castings, the material of which the device is formed, must have substantial structural integrity.

To this end, the grates 10 and 12 will typically be formed of a metal as, for example, cast iron. Thus, the same will not only support extremely heavy castings, but will withstand the relatively high temperatures imparted thereto by hot castings moving along the conveying surface.

The upper surface of the grate 10 defines the conveying surface of the apparatus and as illustrated, both grates 10 and 12 are elongated from left to right so as to provide a conveying path from left to right or vice versa. A conventional vibration imparting means, indicated schematically at 16 in FIG. 2 is associated with the structure including the two grates 10 and 12 in a conventional way for imparting the requisite vibratory motion needed for conveying thereto. As a result, when castings are located on the upper surface of the grate 10, and the vibration imparting means 16 energized, the castings will be conveyed from one end of the grate 10 to the other. In addition, the vibration imparted to the grate 10 will be transferred therefrom to the castings to shake the same and dislodge sand particles employed in the casting process therefrom. Such sand particles will move but a short distance on the surface 10, usually no more than that between adjacent ones of the apertures 14, before falling therethrough. The particles will also fall through the apertures 14 in the lower grate 12 as well as to an underlying location whereat they may be caught for disposal or subsequent use.

It will be recognized that the operation of the conveying device described above will result in continuous metal-to-metal contact between the upper grate 10 and castings received thereon. It will also be recognized that material requirements for the grate 10 will be such that the material will be hard and tend to "ring" throughout the process. That is, in addition to vibrating at a frequency determined by the vibration imparting means 16, the grate 10 will vibrate at a generally much higher frequency within the audible range in much the same manner as a bell. The resulting noise level is exceedingly high and continued exposure to the same will ultimately result in hearing loss. Thus, the invention concerns itself with the provision of means for precluding the conveying surface from ringing substantially within the audible range so as to materially reduce the noise level attendant operation of the apparatus. Because of the nature of the apparatus, i.e., the requirement of a perforate conveying surface permitting separation of sand from castings being conveyed, it is necessary that the means employed for precluding such ringing be such as to avoid substantial interference with the relatively free flow of sand particles through the apertures 14.

To this end, one or more, elongated, ringing precluding means 18 extend the length of the grates 10 and 12 and are sandwiched therebetween. Each ringing precluding means 18 is comprised of an elongated tube 20 in contact with both the lower surface of the grate 10 and the upper surface of the grate 12. The tube 20 is filled with particles 22 of a relatively soft material that will not support vibration in the audible range. One such material found suitable is conventional lead shot.

Preferably, the tube 20 is formed of a metal as, for example, copper with the result that all elements of the device, including the grates 10 and 12, the tube 20, and the shot 22 are metallic and thereby resist deterioration due to elevated temperature.

As best seen in FIG. 3, the grates 10 and 12 may be held in the aforementioned position sandwiching the tube 20 by means of side plates 24 (only one is shown) secured by bolts 26 to both the upper and lower grates 10 and 12 respectively. The side plate 24 may have an upward extension 28 defining a casting retaining side for the conveyor.

From the foregoing, it will be appreciated that the energy imparted to the grate by reason of recurrent metal-to-metal contact of the same with castings will also be imparted to the ringing precluding means 18 by reason of the contact between the two. The energy will also be conveyed to the lead shot 22 within the tube 20 where it will be absorbed due to the individual particles of shot moving slightly therein and the fact that they are made up of a soft material incapable of supporting vibration within the audible range.

As a result, the energy responsible for undesirable "ringing" is quickly absorbed resulting in a rapid dampening of the ring following each contact of a casting with the grate 10 to substantially reduce the noise level attendant the operation to a level tolerable by current standards.

Moreover, as is apparent from the drawings, the cross-sectional dimension of the tubing 20 is but an extremely minor fraction of the width of the conveying surface defined by the grate 10 with the result that the presence of the ringing precluding means 18 at the underside of the grate 10 does not substantially interfere with the free flow of sand particles through the opening 14. Thus, a vibratory conveyor and shake-out device made according to the invention performs the conveying and shake-out operation as efficiently as those prior art constructions heretofore known while having the advantage of substantially reduced noise level during operation thereof.

I claim:

1. A vibratory device adapted to receive castings or the like and vibrate the same to shake loose casting sand therefrom comprising: a metal grate adapted to receive castings for vibrating the same, vibrating means for vibrating said grate to cause the same to impart vibration to castings received thereon, an elongated tube held in abutment with the underside of said grate, and a body of particulate, relatively soft material within said tube adapted to preclude said grate from ringing in the audible range.

2. The vibratory device of claim 1 wherein said particulate material is lead shot, said tubing being formed of a metal whereby the same may stand up to substantial heat imparted to said vibratory device by hot castings received thereon.

3. A vibratory device adapted to receive castings or the like and vibrate the same and shake loose casting sand therefrom, comprising: a metal grate adapted to receive castings for vibrating the same; vibrating means for vibrating said grate to cause the same to impart vibration to castings received thereon; a body of vibration dampening, particulate material adapted to preclude said grate from ringing in the audible range; and elongated housing means holding said body of particulate material against said grate.

4. A vibratory device adapted to receive castings or the like and vibrate the same and shake loose casting sand therefrom, comprising: a metal grate adapted to receive castings for vibrating the same; vibrating means for vibrating said grate to cause the same to impart vibration to castings received thereon; an elongated tube held in abutment with the underside of said grate, and a body of vibration dampening, particulate material within said tube and adapted to preclude said grate from ringing in the audible range.

* * * * *